US012572722B2

(12) United States Patent
Wang et al.

(10) Patent No.: US 12,572,722 B2
(45) Date of Patent: Mar. 10, 2026

(54) KIRIGAMI METAMATERIAL WITH TUNABLE AUXETIC PROPERTY UNDER LARGE TENSIONS AND ITS DESIGN METHOD

(71) Applicant: DALIAN UNIVERSITY OF TECHNOLOGY, Liaoning (CN)

(72) Inventors: Yiqiang Wang, Liaoning (CN); Chen Du, Liaoning (CN); Zhan Kang, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 1029 days.

(21) Appl. No.: 17/639,522

(22) PCT Filed: Jul. 2, 2021

(86) PCT No.: PCT/CN2021/104141
§ 371 (c)(1),
(2) Date: Mar. 1, 2022

(87) PCT Pub. No.: WO2022/193477
PCT Pub. Date: Sep. 22, 2022

(65) Prior Publication Data
US 2023/0185999 A1    Jun. 15, 2023

(30) Foreign Application Priority Data

Mar. 16, 2021    (CN) .......................... 202110278090.0

(51) Int. Cl.
G06F 30/17 (2020.01)
G06F 30/27 (2020.01)
G06F 111/06 (2020.01)

(52) U.S. Cl.
CPC .......... G06F 30/27 (2020.01); G06F 2111/06 (2020.01); Y10T 428/24 (2015.01);
(Continued)

(58) Field of Classification Search
CPC .... G06F 30/27; G06F 2111/06; Y10T 428/24; Y10T 428/24273; Y10T 428/24298; Y10T 428/24314
See application file for complete search history.

(56) References Cited

U.S. PATENT DOCUMENTS

| | | | |
|---|---|---|---|
| 6,676,878 B2 * | 1/2004 | O'Brien ................ | B23K 26/40 |
| | | | 219/121.81 |
| 12,202,226 B2 * | 1/2025 | Corrigan ............. | B31D 5/0065 |
| 2016/0299270 A1 * | 10/2016 | Kotov ................. | G02B 5/1861 |

* cited by examiner

*Primary Examiner* — Donald M Flores, Jr.
(74) *Attorney, Agent, or Firm* — MUNCY, GEISSLER, OLDS & LOWE, P.C.

(57)    ABSTRACT

A kirigami metamaterial with tunable auxetic property under large tensions and a design method for it. The kirigami metamaterial is composed of a plurality of square unit cells in orderly arrangement. The unit cells are arrayed in periodic, gradient and inhomogeneous layouts, corresponding to the kirigami metamaterials with homogeneous, gradient and inhomogeneous auxetic properties. The design method is as follows: Firstly, the heuristic design of the unit cell is obtained by using the structural optimization method for fully considering out-of-plane deformations. Secondly, the optimization result obtained from the above step is processed by geometric reconstruction and parametric modeling, and then the auxetic properties with different geometric parameters are obtained. Finally, the kirigami metamaterial is composed of a plurality of unit cells arrayed into a specific layout. The present invention can achieve a variety of tunable auxetic trends adjusted with the tensions by modifying the cut parameters.

2 Claims, 10 Drawing Sheets

(52) U.S. Cl.
CPC .................. *Y10T 428/24273* (2015.01); *Y10T 428/24298* (2015.01); *Y10T 428/24314* (2015.01)

3

$L_3$

9

$L_2$ $\theta_2$ $L_1$

8

11

10

7

$\theta_1$ $y$ $x$

KIRIGAMI METAMATERIAL WITH TUNABLE AUXETIC PROPERTY UNDER LARGE TENSIONS AND ITS DESIGN METHOD

TECHNICAL FIELDS

The present invention belongs to the technical fields of metamaterials, and refers to a kirigami metamaterial with tunable auxetic property under large tensions and its design method.

BACKGROUND

Kirigami metamaterials are a class of mechanical metamaterials that obtain specific equivalent mechanical properties by the orderly (periodic/gradient/inhomogeneous) arrangements of cuts on the flat sheet structures. It has the advantages of manufacturability, large ductility, reducing material waste and fast load response.

The auxetic kirigami metamaterials achieve transverse expansion under the longitudinal tension loads. This auxetic property can be expressed as the negative value of the ratio of the average transverse elongation to the longitudinal elongation. At present, the existing auxetic kirigami metamaterials, which contain arrangements of cuts with mirror symmetry, chiral symmetry, or anti-chiral symmetry, are obtained by using manual experience or trial-and-try design methods.

Under tensions exceeding a certain proportion of the sample sizes (usually less than 10%), the auxetic kirigami metamaterials trigger unstable out-of-plane buckling deformations, resulting in the inability to maintain the specified auxetic properties. This is partly due to the small out-of-plane stiffness of the sheet structure, and partly due to the preset cuts and their layout which reduce the out-of-plane stiffness in local area. At the same time, the existing auxetic kirigami metamaterials are also prone to high strain (or high stress) under large tensions. It causes failure or even though rupture of the substrate material, which has a negative impact on the reliability, deformation recoverability and equivalent property. The two performance defects limit the practical application of kirigami metamaterials.

Therefore, it is an urgent technical problem in the technical field of kirigami metamaterials to provide a kirigami metamaterial achieving the auxetic property adjusted with tensions to meet a specific law, and deformation recoverability. Moreover, it is also of great significance for application of kirigami metamaterials.

SUMMARY

In response to the above technical deficiencies, the present invention provides a kirigami metamaterial with tunable auxetic property under large tensions and a design method for it. Under large tension loads, these metamaterials can achieve tunable auxetic properties and excellent deformation recoverability. Besides, they are simple in manufacture and suitable for a variety of substrate materials.

The technical solution of the present invention is:

A kirigami metamaterial with tunable auxetic property under large tensions, characterized in that the kirigami metamaterial 1 is composed of a plurality of square unit cells 2 which are in orderly arrangement, wherein the orderly arrangement refers to: periodic, gradient or irregular arrangement of the plurality of the square unit cells 2 in the kirigami metamaterial 1, and corresponding kirigami metamaterials 1 have homogeneous auxetic property, gradient auxetic property and specified inhomogeneous auxetic properties respectively.

Each of the square unit cells 2 has side length L and thickness t, consists of one ¼ square domain 3 and another three ¼ square domains obtained by mirroring the ¼ square domain along the X-axis/Y-axis 6 in the unit cell, respectively. Two cuts 5 with the same shape are preset in the ¼ square domain 3, which satisfy the rotational symmetry about the center of the ¼ square domain. In one complete square unit cell 2, the layout of all cuts 5 satisfies anti-chiral symmetry about the center of the unit cell.

All cuts 5 in the ¼ square domain 3 have a uniform width w, one cut cusp 4 of one cut 5 is located at one vertex 11 of the ¼ square domain 3, and the other cut cusp 4, which is in an arc shape and has a radius of w/2, is located inside the ¼ square domain; the one cut 5 is in an elongated three-segment broken line shape, and starting from the vertex 11 of a ¼ square domain, consists of a first cut segment 7, a middle cut segment 8 and a last cut segment 9, described by the following cut parameters: the lengths of the centerlines 10 of the first cut segment 7, the middle cut segment 8 and the last cut segment 9 are denoted by $L_1$, $L_2$ and $L_3$, respectively; the angle between the first cut segment 7 and the bottom boundary of the ¼ square domain 3 is denoted by $\theta_1$; the middle cut segment 8 is parallel to the Y-axis; the relative angle between the middle cut segment 8 and the last cut segment 9 is denoted by $\theta_2$, which is always located on the side of the middle cut segment 8 close to the unit cell boundary.

Furthermore, the value ranges of the geometric parameters utilized to describe the configuration of one square unit cell 2 are as follows: the variation range of the parameter t/L is 0.0033-0.0167; the variation range of the parameter $L_1$/L is 0.33-0.44; the variation range of the parameter $L_2$/L is 0.08-0.39; the variation range of the parameter $L_3$/L is 0.10-0.29; the variation range of parameter $\theta_1$ is 0°-11.5°; the variation range of the parameter $\theta_2$ is 60°-160°; the variation range of the parameter w/L is 0.001-0.033. All parameters can take the end values of their value ranges. When $\theta_1$=0°, the centerline 10 of the first cut segment 7 overlaps with the boundary of the ¼ square domain 3. In this case, the first cut segment 7 with width w/2 combines with a first cut segment 7 in other ¼ square domain to form a first cut segment with width w at the unit cell symmetry axis.

Furthermore, a basis material of the kirigami metamaterial 1 is made of metal or polymer (rubber, PET or PVC) by knife cutting, laser cutting, water cutting or 3D printing technology.

A design method for kirigami metamaterial with tunable auxetic property under large tensions, comprising the following steps:

S1. By using the structural optimization method and fully considering the out-of-plane deformation constraints, obtaining the heuristic design of the unit cell configuration as follows:

Firstly, selecting a square unit cell 2 as a design domain, and applying periodic boundary conditions to boundaries thereof to simulate real deformations in the metamaterial, while saving analysis costs and shortening the design cycle. Secondly, presetting a specified number free-curved cuts 20, utilizing the arrangement positions, shapes and lengths of the free-curved cuts 20 as design variables, and the length and maximum curvature of the free-curved cuts 20 as constraint conditions. Further, utilizing a gradient algorithm, an intelligence algorithm, or an optimization algorithm combining the two to update the design variables and optimize the arrangement positions, shapes and lengths of the cuts to obtain the unit cell with specified auxetic property, thus implementing the heuristic design of the unit cell configuration.

In the iterative optimization process: performing finite element analysis on the unit cell to obtain the deformations thereof during the loading process. Firstly, performing linear buckling analysis on the unit cell, and then introducing the low-order modes obtained from the analysis into the finite element model as initial geometric imperfections to modify node coordinates. Selecting a nonlinear finite element method to obtain a deformation response under tension load and calculating a value of auxetic property, fully considering the influence of complex out-of-plane buckling deformations on the auxetic property.

S2. Performing geometric reconstruction and parametric modeling on the optimization result obtained in step S1, and obtaining the auxetic properties under different geometric parameters as follows:

The free-curved cut 20 in the optimized unit cell configuration is reconstructed into a three-segment broken line shape cut 22, which helps to improve the manufacturing precision of the kirigami metamaterials in addition to facilitating the parameter description. Using the length and distribution angle of each segment in the three-segment broken line shape cut 22 as parameters, describing the unit cell configuration 23 containing the three-segment broken line shape cut 22 after geometric reconstruction. Performing parameter learning, traversing all cut parameters within the specified parameter range to obtain the corresponding auxetic properties of the unit cells.

S3. Periodically, gradiently or irregularly arranging the plurality of parameterized unit cells obtained in step S2, to construct a kirigami metamaterial as follows:

periodically arranging a plurality of unit cells described using same cut parameters to construct a kirigami metamaterial with homogeneous auxetic property; and gradiently or irregularly arranging a plurality of unit cells described using different cut parameters to construct a kirigami metamaterial with gradient or specified inhomogeneous auxetic property.

Furthermore, the description method of the centerline 10 of the free-curved cut 20 in step S1 includes B-spline interpolation function, non-uniform rational B-spline interpolation function and analytic curve function.

Furthermore, the nonlinear finite element method in step S1 includes the Newton-Raphson method and the modified Riks method; the optimization algorithm includes the nonlinear sequential quadratic programming algorithm (gradient algorithm) and the genetic algorithm (intelligent algorithm)

Compared with the existing technologies, the present invention has the following benefits:

(1) The present invention provides kirigami metamaterials that can always obtain specified auxetic properties under 5% to 50% uniaxial tensions. The tensions are no more than 50% of the sample sizes. A variety of tunable auxetic trends adjusted with the tensions can also be achieved by modifying the cut parameters.

(2) The out-of-plane buckling deformations, which are fully considered in the design process, are reasonable utilized for the kirigami metamaterials to significantly reduce the in-plane stresses and thus obtain the deformation recoverability under large tensions.

(3) The kirigami metamaterials provided by the present invention can contain a plurality of unit cells in periodic, gradient or inhomogeneous arrangements, which obtain homogeneous, gradient, and specified inhomogeneous auxetic properties, respectively. Compared with the existing kirigami metamaterials, the present invention has obvious advantages in structural design, scope of use and potential application.

DESCRIPTION OF DRAWINGS

FIG. 1(a) is a schematic diagram of the kirigami metamaterials, FIG. 1(b) is the configuration of the unit cell, and FIG. 1(c) is a ¼ square domain in the unit cell in top view;

FIG. 2(a) and FIG. 2(b) show the deformations of the unit cell shown in FIG. 1 under the tensions, where FIG. 2(a) is the structural deformation of the unit cell under 10% tension, FIG. 2(b) is the structural deformation of the unit cell under 20% tension.

FIG. 3(a) is the unit cell with the minimum value of −0.27 for auxetic property under tensions not exceeding 50%, FIG. 3(b) is the unit cell with the minimum value of −0.94 for auxetic property under tensions not exceeding 50%, and FIG. 3(c) is the unit cell with the minimum value of −1.90 for auxetic property under tensions not exceeding 50%

FIG. 5(a) is the top view of a kirigami metamaterial containing periodic arrangement of unit cells, FIG. 5(b) is the top view of a kirigami metamaterial containing gradient arrangement of unit cells, and FIG. 5(c) is the top view of a kirigami metamaterial containing inhomogeneous arrangement of unit cells.

FIG. 6(a) is a schematic diagram of the centerline of the cut by using non-uniform rational B-splines and FIG. 6(b) is the ¼ square domain containing the cut in the top view.

FIG. 7(a) is the top view of a unit cell with free-curved cuts obtained by structural optimization and FIG. 7(b) is the unit cell with elongated three-segment broken line cuts after the geometric reconstruction in the top view.

In the Figures: 1 Kirigami metamaterial; 2 Square unit cell; 3¼ square design domain making up the square unit cell; 4 One cusp of the cut; 5 Cut; 6 X-axis/Y-axis in the unit cell; 7 First segment of the cut; 8 Middle segment of the cut; 9 Last segment of the cut; 10 Centerline of the cut; 11 One vertex of the ¼ square domain; 12 Uniaxial tension loads; 13 Out-of-plane buckling deformations; 14-17 Unit cells of the kirigami metamaterials with different parameter combinations; 18 Control points for modeling of free-curved cut; 19 Connection lines of control points; 20 Free-curved cut; 21 Geometric model of the unit cell; 22 Elongated three-segment broken line cut; 23 Configuration of the unit cell.

DETAILED DESCRIPTION

Figure 1A:
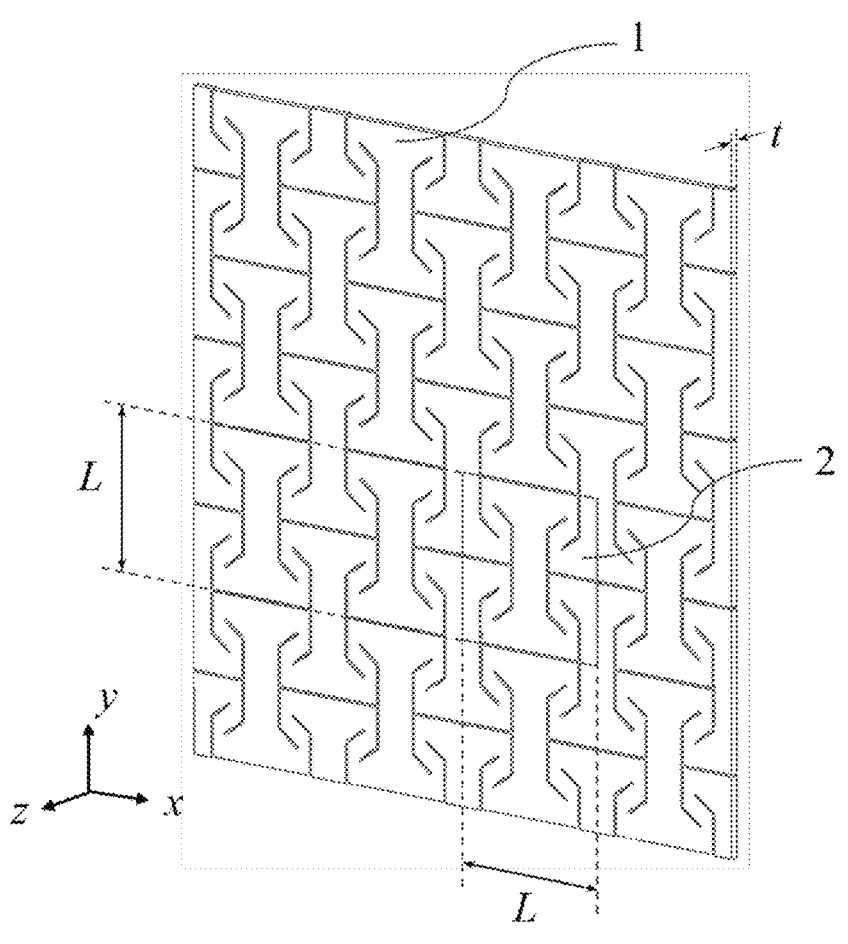
FIG. 1(a) and FIG. 1(b) show a kirigami metamaterial and its contained unit cells provided by the present invention, where
Figure 1B:
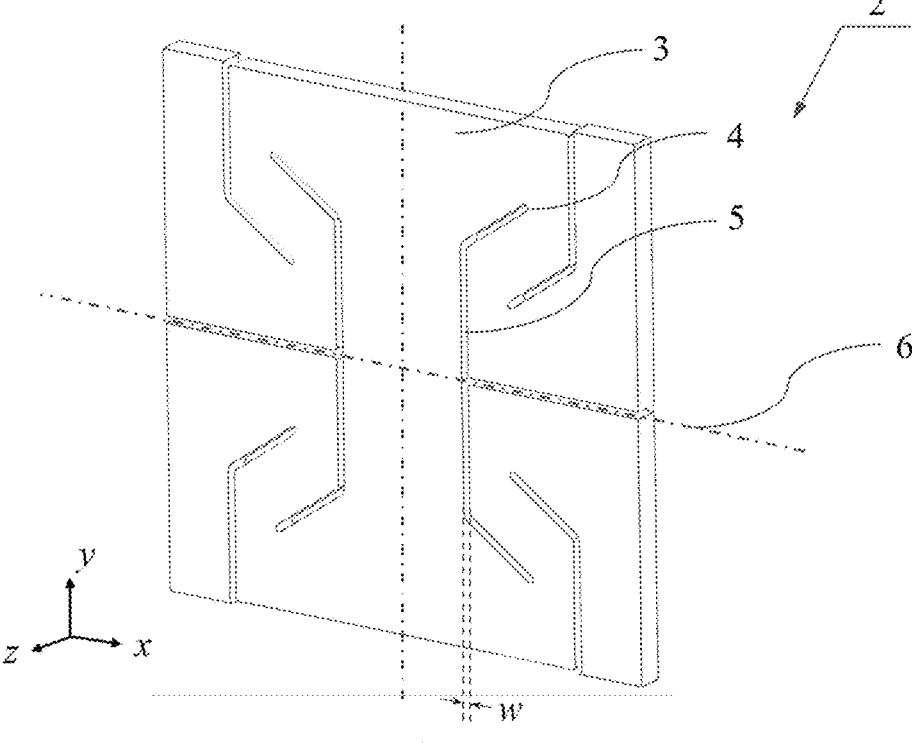
Figures 1C, 2A:
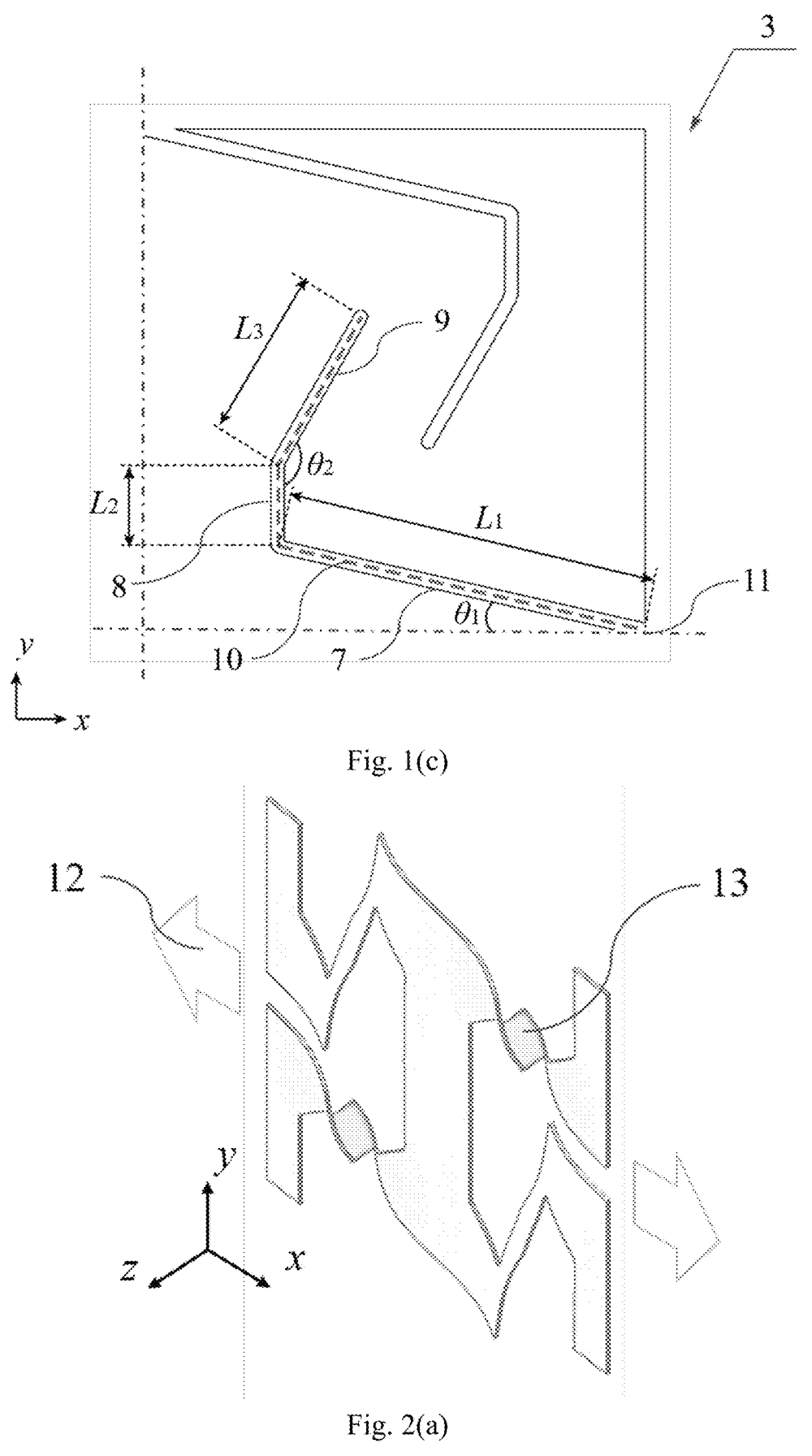

In order to fully illustrate the present invention, further details are further described below in combination with accompanying drawings and embodiment. It should be understood that the embodiment described herein are used only to explain the invention, but do not limit it. Referring to FIG. 1(*a*) and FIG. 5(*a*)-(*c*), the present invention provides a kirigami metamaterial 1 with tunable auxetic property under large tensions, which is composed of orderly (periodic/gradient/inhomogeneous) arrangements of the square unit cells 2.

One of the square unit cells 2, with side length L and thickness t, consists of a ¼ square domain 3 and the other three ¼ square domains obtained by mirroring it along the X-axis/Y-axis 6 in the unit cell. Two cuts 5 with elongated three-segment broken lines are preset in the ¼ square domain 3, which satisfy the rotational symmetry about the center of the ¼ square domain. In the complete square unit cell 2, the layout of all cuts 5 satisfies the anti-chiral symmetry about the center of the unit cell. As shown in FIG. 1(*b*), the unit cell 2 has side length L=30.0 mm and thickness t=0.3 mm.

Figure 7A:
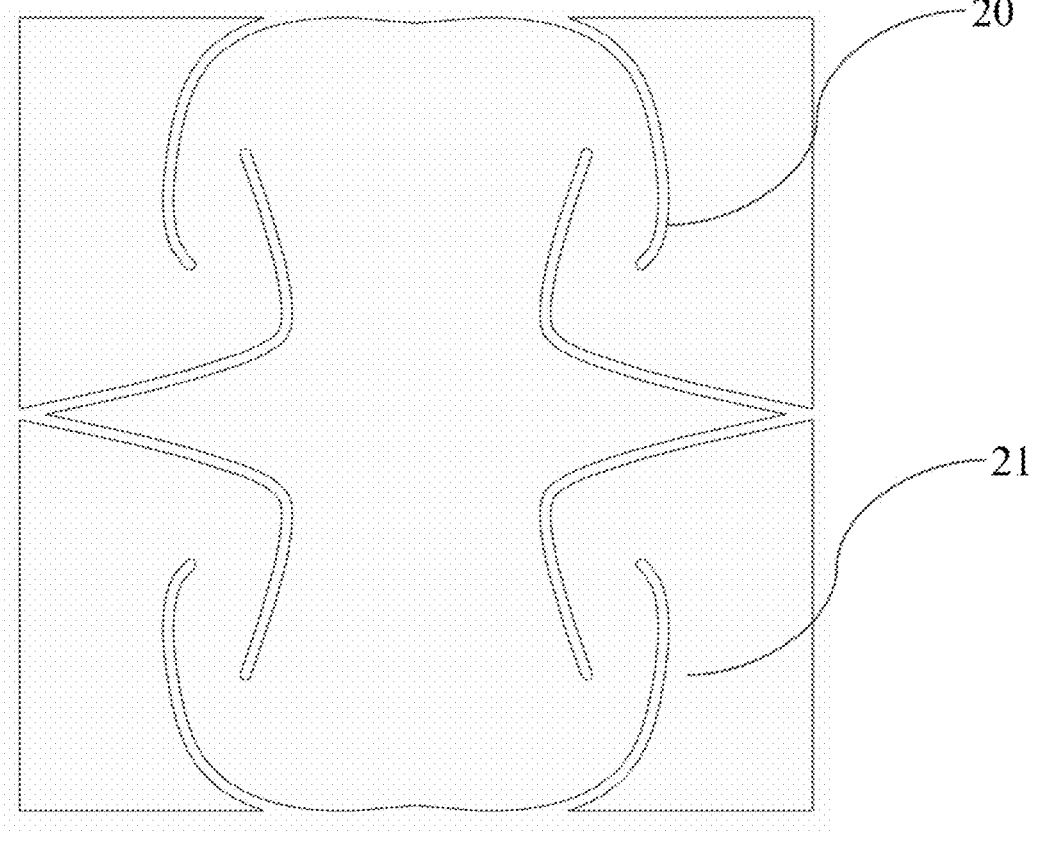
FIG. 7(a) and FIG. 7(b) are schematic diagrams of the geometric reconstruction in the design flow, where
Figure 7B:
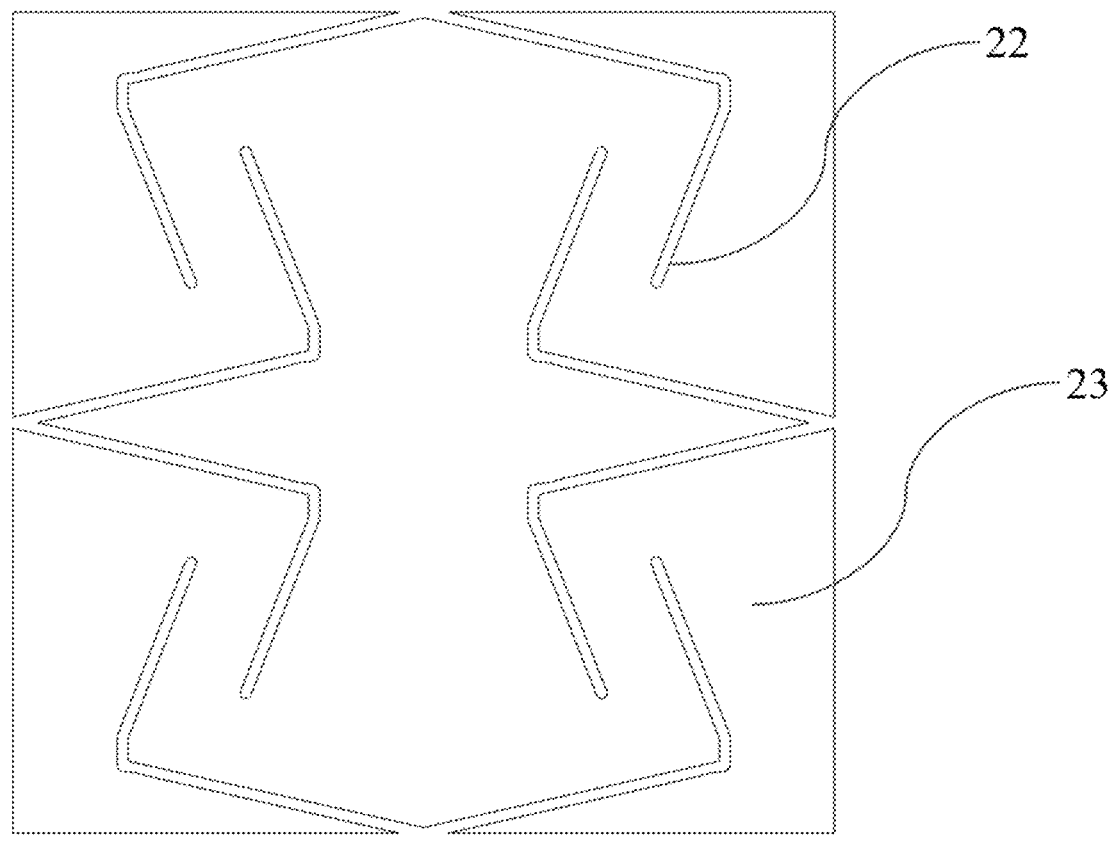

The cut 5, with uniform width w in one ¼ square domain 3, is shaped as elongated three-segment broken line as shown in FIG. 1(*c*) and FIG. 7(*b*). One cusp of the cut is located at the vertex 11 of the ¼ square domain 3, and the other cusps 4 is an arc shape with a radius of w/2. The cut 5 consists of the first cut segment 7, the middle cut segment 8 and the last cut segment 9.

The cut 5 in the square unit cell 2 shown in FIG. 1(*b*) is characterized by the following cut parameters: The lengths of the cut centerlines 10 of the first, middle and last cut segments are $L_1$=11.0 mm, $L_2$=7.6 mm and $L_3$=4.7 mm, respectively; the angle between the first cut segment with width w/2=0.2 mm and the bottom boundary of the ¼ square domain 3 is $\theta_1$=0°; the angle between the cut middle and last segments with width w=0.4 mm is $\theta_2$=113°.

Figure 2B:
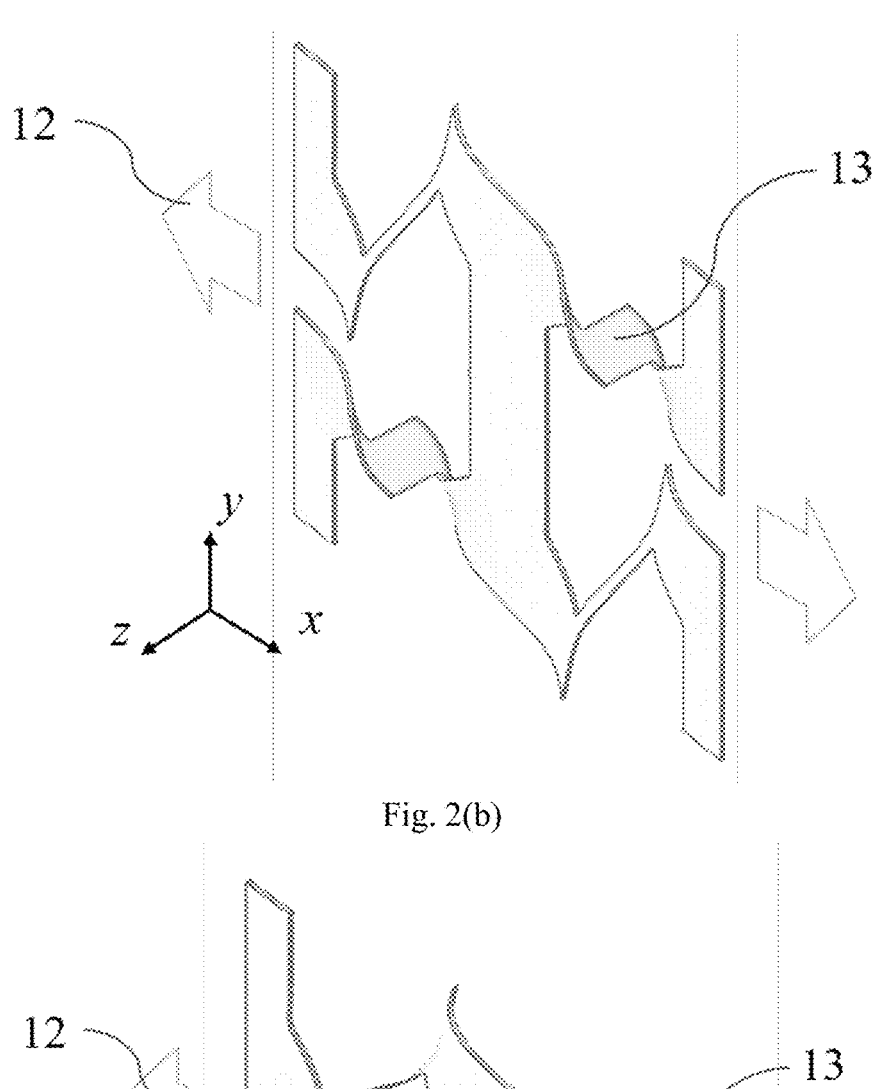
Figure 2C:
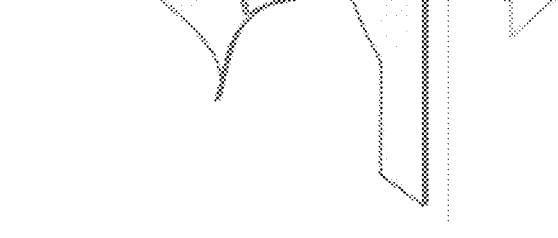
FIG. 2(c) is the structural deformation of the unit cell under 30% tension.

The structural characteristic of the thickness t being far less than the side length L and internal cut layout of the square cell 2 weaken local stiffness, triggering the instability under load and thus resulting in the out-of-plane deformation. Fully considering the out-of-plane deformation in the design process, the unit cell produces significant out-of-plane buckling deformations with the appearance of auxetic performance under uniaxial tension load 12 in X-direction as shown in FIG. 2, owing to instability under tensions over 3% of the side length L. Under larger tensions, the auxetic properties of the unit cell are steady around specified value. When the tension reaches 10%, 20% and 30% of the side length L, the values of the auxetic properties are all −0.7, and the deformations are shown in FIG. 2(*a*)-(*c*) including the out-of-plane buckling deformation 13 as shown in FIG. 2.

Figure 3A:
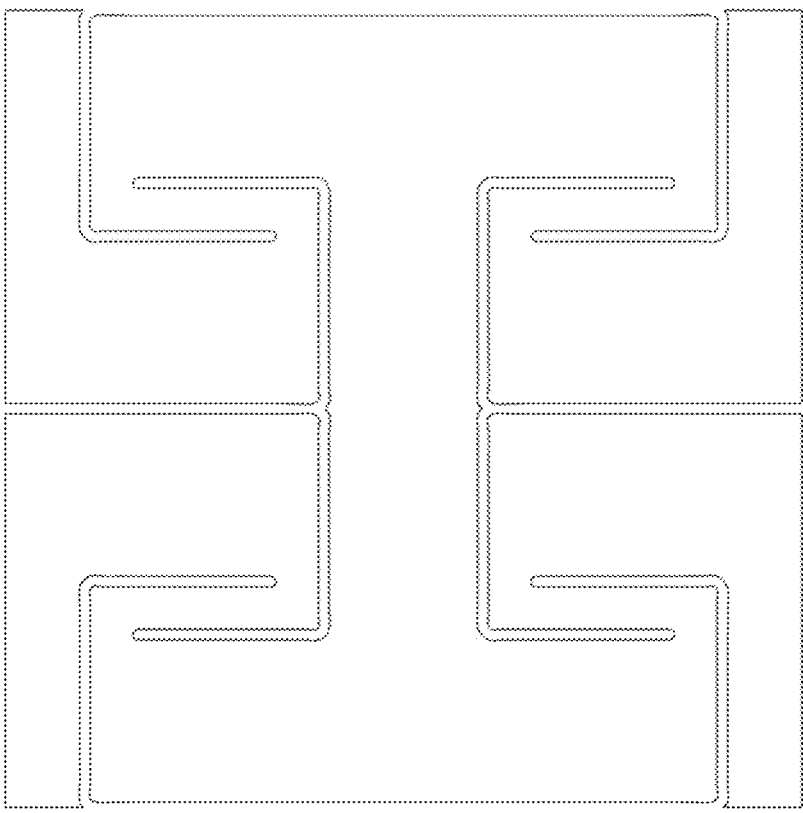
FIG. 3(a), FIG. 3(b) and FIG. 3(c) show the unit cells with difference geometric parameters in top view, where
Figure 3B:
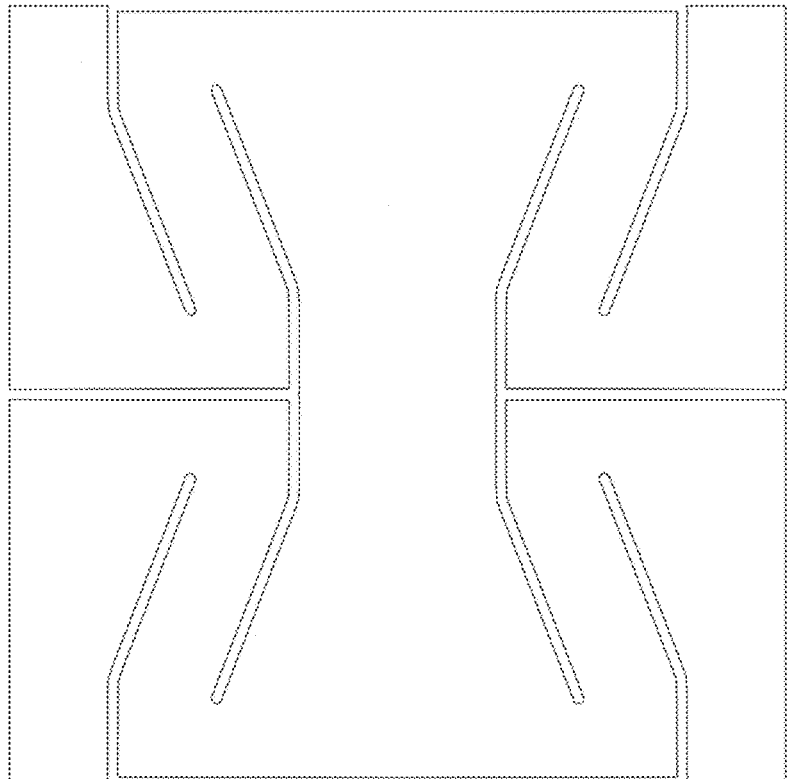
Figure 3C:
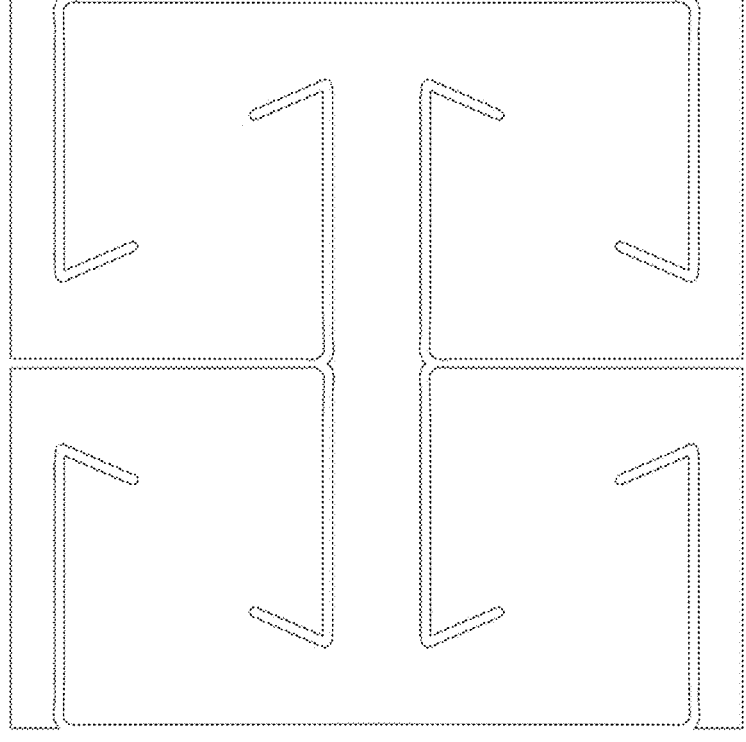
Figure 4:
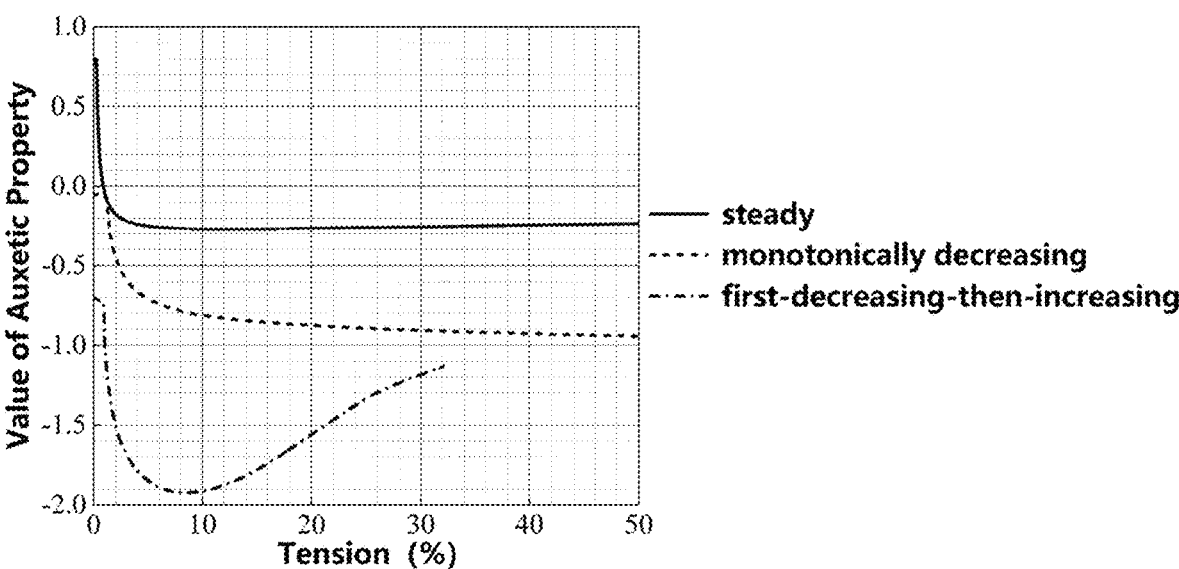
FIG. 4 shows the curves indicating auxeticity of kirigami metamaterials with different geometric parameters.

The deformations and the auxetic properties resulting from deformations of the unit cell provided by the present invention are mainly determined by the geometric parameters. Different unit cell configurations, whose auxetic properties are in the range from −0.2 to −1.9 with different trends (steady, monotonically decreasing and first-decreasing-then-increasing), can be obtained by different combinations of geometric parameters within their value ranges. As preferred, with fixed side length L=30.0 mm, thickness t=0.3 mm and cut width w=0.4 mm, different unit cell configurations as shown in FIG. 3 are obtained by different combinations of cut parameters as follows:

(1) The unit cell 15 shown in FIG. 3(*a*) is characterized by the following cut parameters: The lengths of the cut centerlines 10 of the first, middle and last cut segments are $L_1$=12.0 mm, $L_2$=8.5 mm and $L_3$=7.0 mm, respectively; the angle between the first cut segment 7 of the cut and the bottom boundary of the ¼ square domain 3 is $\theta_1$=0°; the angle between the middle 8 and last 9 cut segments of the cut is $\theta_2$=90°. A steady curve indicating auxeticity with the minimum value of −0.27 is achieved as shown in FIG. 4.

(2) The unit cell 16 shown in FIG. 3(*b*) is characterized by the following cut parameters: The lengths of the cut centerlines 10 of the first, middle and last cut segments are $L_1$=11.0 mm, $L_2$=4.0 mm and $L_3$=8.3 mm, respectively; the angle between the first cut segment 7 of the cut and the bottom boundary of the ¼ square domain 3 is $\theta_1$=0°; the angle between the middle 8 and last 9 cut segments of the cut is $\theta_2$=160°. A monotonically decreasing curve indicating auxeticity with the minimum value of −0.94 is achieved as shown in FIG. 4.

(3) The unit cell 17 shown in FIG. 3(*c*) is characterized by the following cut parameters: The lengths of the cut centerlines 10 of the first, middle and last cut segments are $L_1$=13.0 mm, $L_2$=11.5 mm and $L_3$=3.4 mm, respectively; the angle between the first cut segment 7 of the cut and the bottom boundary of the ¼ square domain 3 is $\theta_1$=0°; the angle between the middle 8 and last 9 cut segments of the cut is $\theta_2$=66°. A first-decreasing-then-increasing curve indicating auxeticity with the minimum value of −1.90 is achieved as shown in FIG. 4.

Figure 5A:
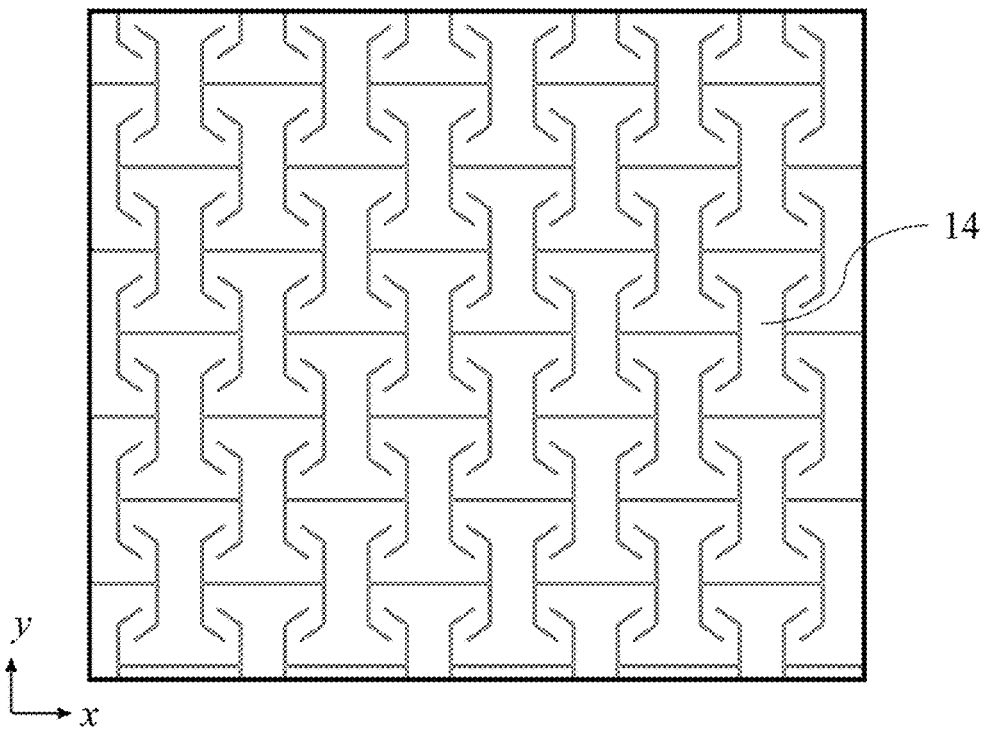
FIG. 5(a), FIG. 5(b), and FIG. 5(c) show the kirigami metamaterials with different arrangements of unit cells, where
Figure 5B:
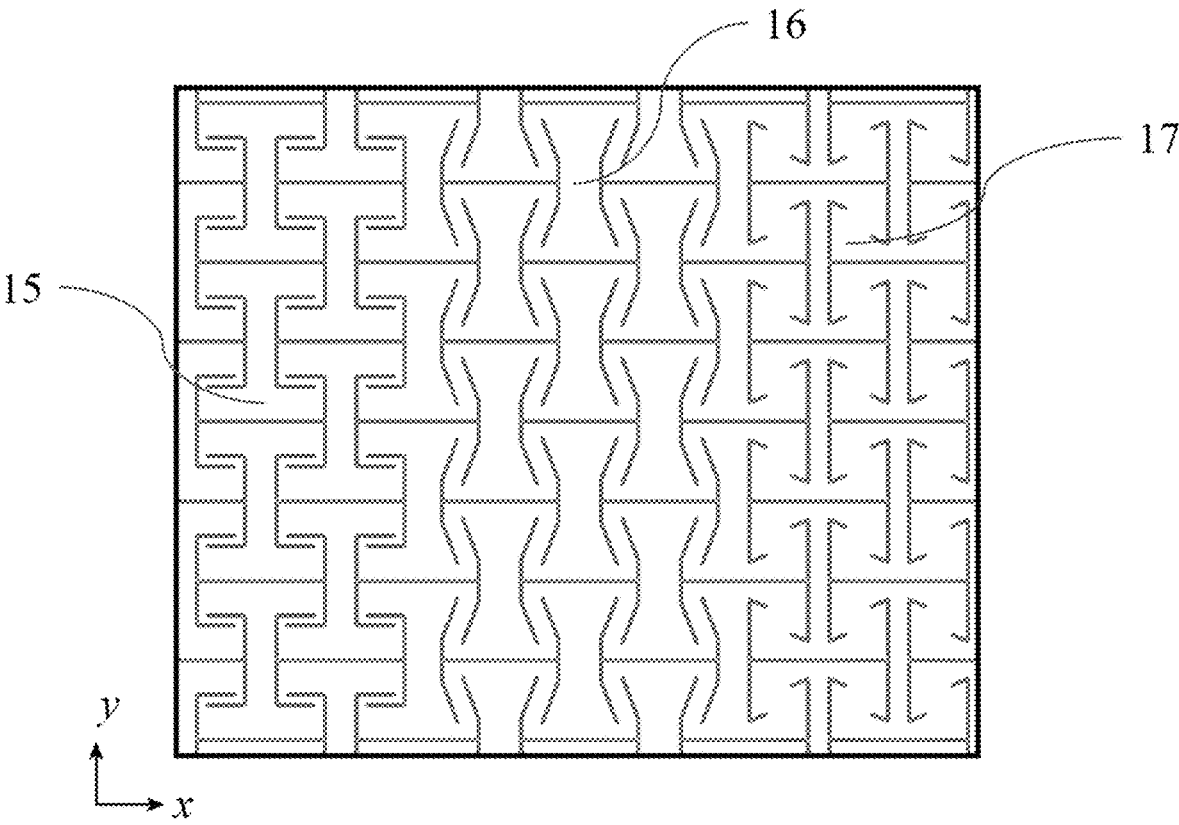
Figure 5C:
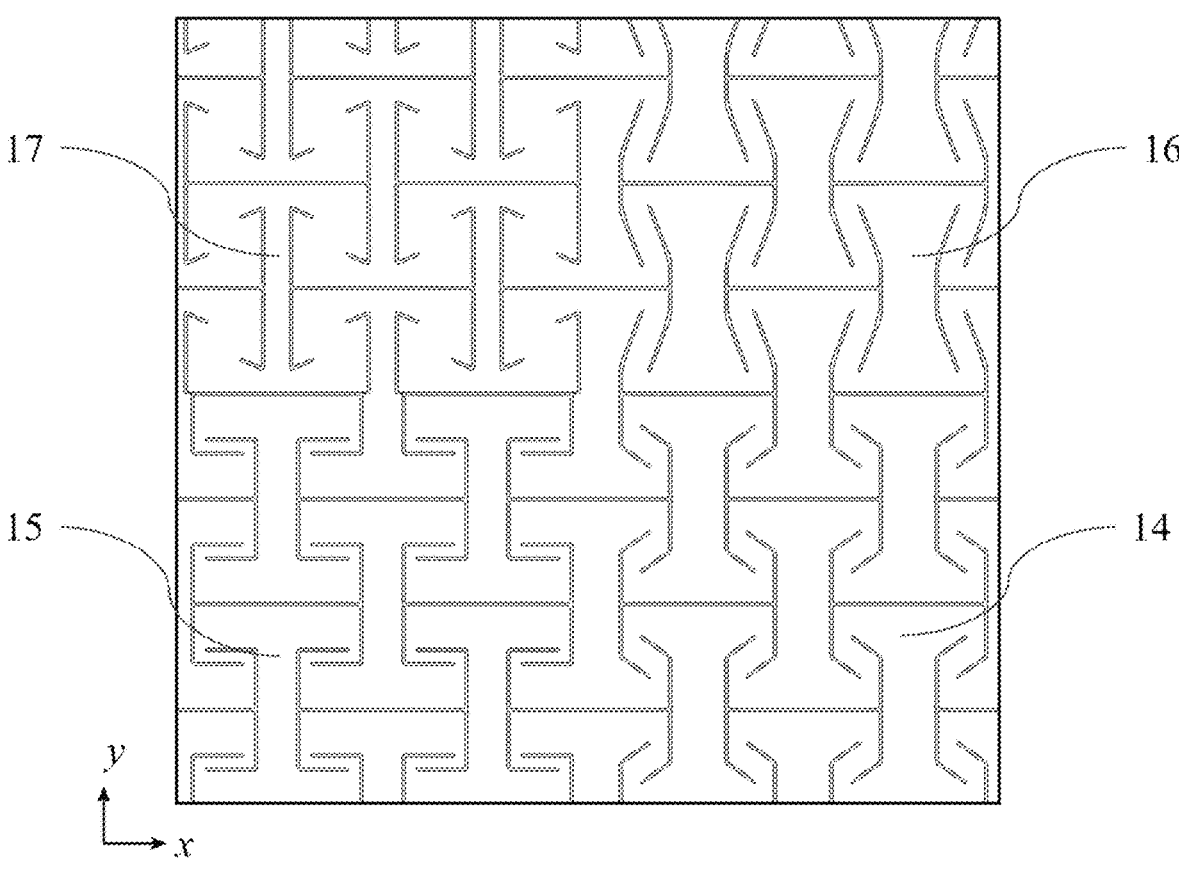

The kirigami metamaterials provided by the present invention comprises specified periodic, gradient or inhomogeneous arrangements of unit cells with different cut parameters, which obtain homogeneous, gradient and specified inhomogeneous auxetic properties, respectively. The kirigami metamaterial with homogeneous auxetic property, as shown in FIG. 5(*a*), consists of periodic arrangement of the unit cells 14 along X- and Y-axis. The kirigami metamaterial with gradient auxetic property along X-direction, as shown in FIG. 5(*b*), consists of the unit cells 15, 16 and 17 in gradient arrangement along X-axis and periodic arrangement along Y-axis. The kirigami metamaterial with inhomogeneous auxetic property along all direction, as shown in FIG. 5(*c*), consists of the unit cells 14, 15, 16 and 17 in inhomogeneous arrangement along X- and Y-axis.

The kirigami metamaterials in the embodiment are based on polymer material PET and are manufactured by laser cutting.

Figure 6A:
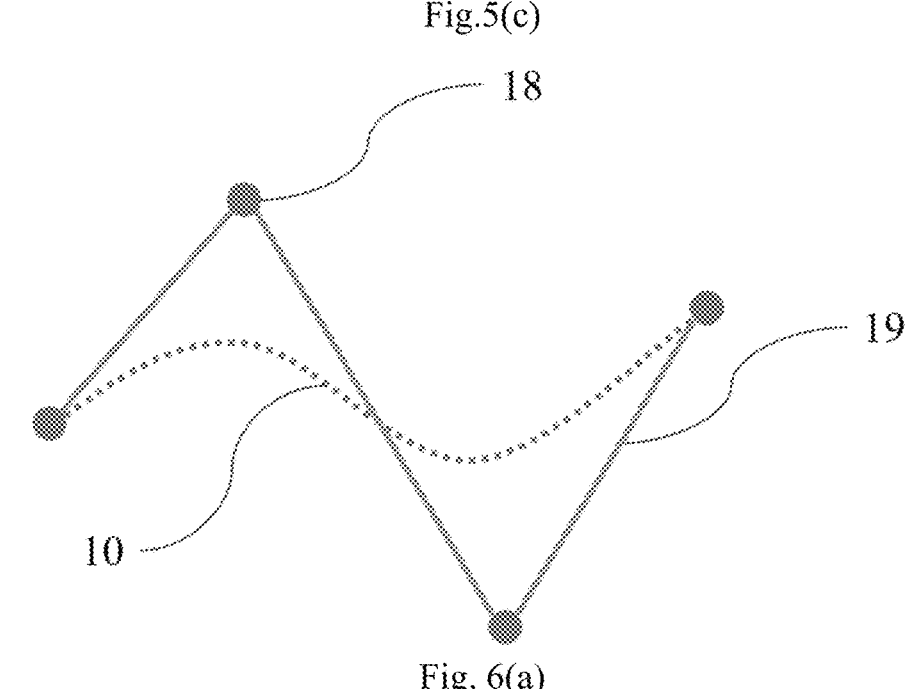
FIG. 6(a) and FIG. 6(b) are schematic diagrams of modeling one cut in a ¼ square domain in the structural optimization of the design flow, where
Figure 6B:
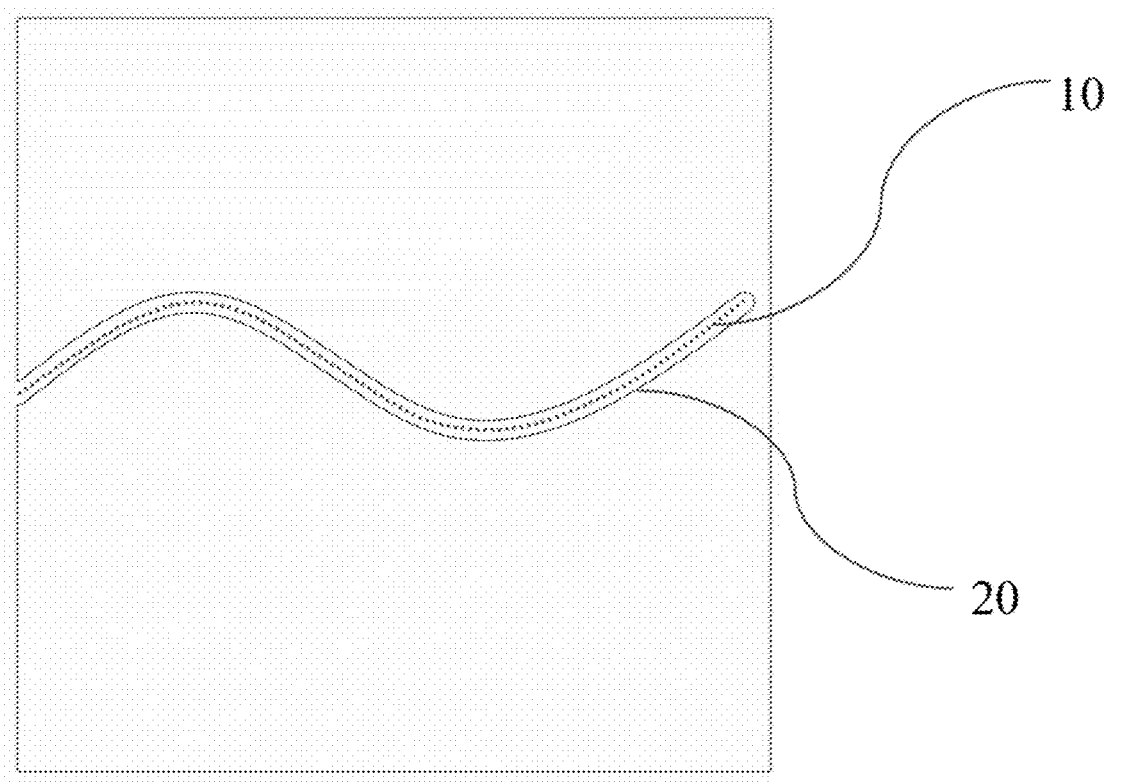
Figure 8:
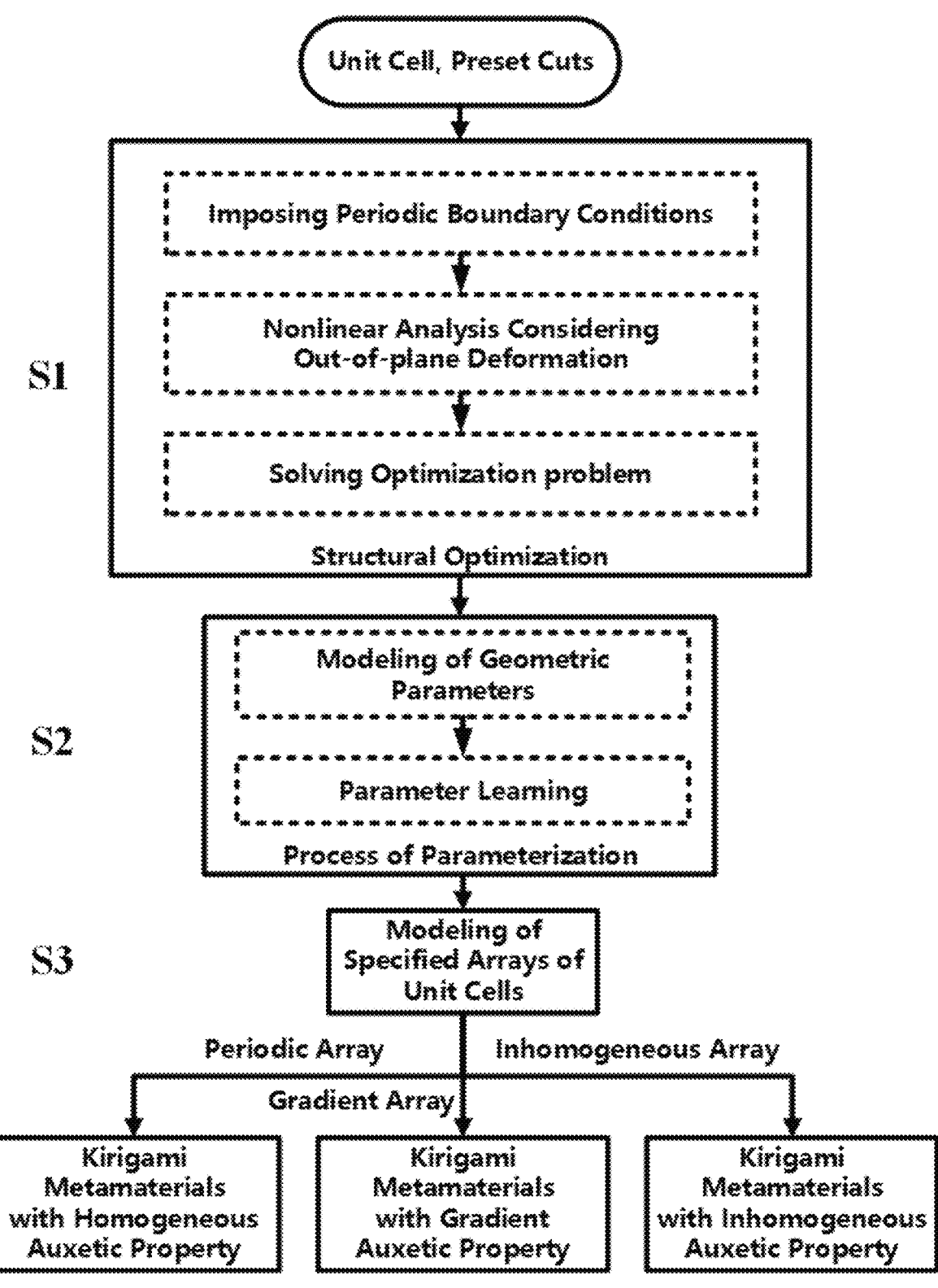
FIG. 8 is the flow chart of the kirigami metamaterials design method provided by the present invention.

The embodiment also provides the design method for the kirigami metamaterials, whose flow chart is shown in FIG. 8 with the following detailed steps:

S1. By using the structural optimization method for fully considering the out-of-plane deformations, the heuristic design of the unit cell is obtained as follows:

Firstly, a geometric model of a periodic square unit cell 21 is established as design domain. Two free-curved cuts 20 are preset in one ¼ square domain 3 of the unit cell 21, and their centerlines are constructed using non-uniform rational B-splines. Based on a curved control polygon assembled by sequentially connecting control points 18 with connecting lines 19 and a second-order non-uniform rational B-splines, a free-curved cut centerline 10 can be obtained by interpolation of the coordinates of the control points; further, the slender free-curved cut 20, shown in FIG. 6(*b*), is constructed by offsetting the centerline 10 of the cut by 0.2 mm on both sides along the normal direction at each point using curve offset, wherein the ends are arc shape; finally, the complete anti-chiral geometric model of unit cell is obtained by mirroring the ¼ square domain with cuts along the X- and Y-axis.

Finite element analysis is performed on the unit cell in the optimization design process. Periodic boundary conditions are imposed on the unit cell boundaries, i.e., corresponding points on the boundaries have equal displacement differences, to simulate real deformations of the unit cell in the metamaterials while saving computational costs and shortening design cycle; and the scaled and superimposed multi-order linear buckling modes are introduced into the analysis model as initial geometric imperfections, to simulate manufacturing imperfections for possible out-of-plane buckling deformations. Further, the Newton-Raphson method for nonlinear analysis is utilized to perform the analysis of the unit cell under tension load along X-direction.

For the structural optimization, the coordinates of each cut control points in the ¼ square domain are chosen as design variables; the specified auxetic properties under different tensions are chosen as optimization target; the lengths and maximum curvature of the cuts are chosen as constraints. The structure optimization process consists of two steps: Firstly, multi-island genetic algorithm classified into intelligent algorithms is utilized to search optimum in the whole design space and obtain the spatial coordinates of the control points close to the optimal solution. Secondly, nonlinear sequential quadratic programming algorithm, classified into gradient algorithms, are used to perform the local optimization in the design space near the optimized solution from the first step. In this way, the optimal positions of the cut control points can be obtained, and the heuristic design of the free-curved unit cell configuration 21 in FIG. 7(*a*) is finally obtained.

S2. Geometric reconstruction and parametric modeling of the optimized configuration obtained in S1, as follows:

The free-curved cut is transformed into elongated three-segment broken line cut, which is described by the length and the laydown angle of each segment. In the embodiment, the optimized configuration of the unit cell as shown in FIG. 7(*a*) is through geometric construction to obtain a parametric model of elongated three-segment broken line cut as shown in FIG. 7(*b*).

All geometric parameters are traversed to obtain the corresponding auxetic properties. As preferred, the traversal of the parameters is implemented with value range values within the specified range.

S3. The kirigami metamaterials comprise a plurality of unit cells in different arrangements, as follows:

The kirigami metamaterial achieving homogeneous auxetic property, whose internal arrangement is shown in FIG. 5(*a*), consists of a plurality of periodic unit cells with same cut parameters. The kirigami metamaterial achieving gradient auxetic property, whose internal arrangement is shown in FIG. 5(*b*), consists of a plurality of unit cells with different cut parameters along certain direction. The kirigami metamaterial achieving inhomogeneous auxetic property, whose internal arrangement is shown in FIG. 5(*c*), consists of a plurality of unit cells with different cut parameters along each direction.

The above embodiment only demonstrates the way of implementation pf the present invention, but it does not put any limits on the scope of the present invention. It should be noted that for those skilled in the art, a number of variations and improvements can be implemented without departing from the conception of the present invention, all of which fall within the protection scope of the present invention. The uncertain components in this embodiment can be realized with prior technologies.

The invention claimed is:

1. A kirigami metamaterial with tunable auxetic property under large tensions, wherein the kirigami metamaterial is composed of a plurality of square unit cells which are in an orderly arrangement, wherein the orderly arrangement refers to: periodic, gradient or irregular arrangement of the plurality of the square unit cells in the kirigami metamaterial, and the kirigami metamaterial having a homogeneous auxetic property, a gradient auxetic property, and inhomogeneous auxetic properties, respectively;

each of the square unit cells has a side length L and a thickness t, consists of one ¼ square domain and another three ¼ square domains obtained by mirroring the one ¼ square domain along the X-axis and/or Y-axis in the square unit cell; two cuts with the same shape are preset in the one ¼ square domain, which satisfy a rotational symmetry about the center of the one ¼ square domain; in one complete square unit cell, the layout of all the cuts satisfies an anti-chiral symmetry about the center of the one complete square unit cell;

all cuts in the one complete square ¼ square domain have a uniform width w, one cut cusp of one cut is located at one vertex of the one ¼ square domain, and the other cut cusp, which is in an arc shape and has a radius of w/2, is located inside the one ¼ square domain; the one cut is in an elongated three-segment broken line shape, and starting from a vertex of the one ¼ square domain, consists of a first cut segment, a middle cut segment and a last cut segment, described by the following cut parameters: the lengths of the centerlines of the first cut segment, the middle cut segment and the last cut segment are denoted by $L_1$, $L_2$ and $L_3$, respectively; an angle between the first cut segment and a bottom boundary of the one ¼ square domain, which is a boundary of the one ¼ square domain that lies on or is parallel to either the X-axis or the Y-axis, is denoted by $\theta_1$; the middle cut segment is parallel to the Y-axis; and a relative angle between the middle cut segment and the last cut segment is denoted by $\theta_2$, which is always located on a side of the middle cut segment closest to any boundary of the one complete square unit cell, wherein the value ranges of the geometric parameters utilized to describe the configuration of one square unit cell are as follows: a variation range of a parameter t/L is 0.0033-0.0167; a variation range of a parameter $L_1$/L is 0.33-0.44; a variation range of a parameter $L_2$/L is 0.08-0.39; a variation range of a parameter $L_3$/L is 0.10-0.29; a variation range of $\theta_2$ is 60°-160°; a variation range of a parameter w/L is 0.001-0.033; and a variation range of $\theta_1$ is 0°-11.5°, and the centerline of the first cut segment overlaps with the bottom boundary of the one ¼ square domain when $\theta_1$=0°, and the width of the first cut segment is w/2.

2. The kirigami metamaterial with tunable auxetic property under large tensions according to claim 1, wherein a basis material of the kirigami metamaterial is made of metal or polymer by knife cutting, laser cutting, water cutting or 3D printing technology.

\* \* \* \* \*